H. J. HANSON.

BALING PRESS.

APPLICATION FILED AUG. 31, 1914.

Reissued Oct. 20, 1914.

13,810.

Witnesses
James P. Barry
Lewis E. Bowman

Inventor
Hans J. Hanson
By Whittemore Hulbert & Whittemore
Attys.

THE NORRIS PETERS CO., PHOTO-LITHO., WASHINGTON, D. C.

UNITED STATES PATENT OFFICE.

HANS J. HANSON, OF ANN ARBOR, MICHIGAN, ASSIGNOR TO ANN ARBOR MACHINE COMPANY, OF ANN ARBOR, MICHIGAN, A CORPORATION OF MICHIGAN.

BALING-PRESS.

13,810. Specification of Reissued Letters Patent. Reissued Oct. 20, 1914.

Original No. 971,606, dated October 4, 1910, Serial No. 502,898. Application for reissue filed August 31, 1914. Serial No. 859,557.

*To all whom it may concern:*

Be it known that I, HANS J. HANSON, a citizen of the United States of America, residing at Ann Arbor, in the county of Washtenaw and State of Michigan, have invented certain new and useful Improvements in Baling-Presses, of which the following is a specification, reference being had therein to the accompanying drawings.

The invention relates to baling presses, and it is the object of the invention to simplify the structure and to overcome certain defects in the construction of the press mechanism.

Figure 2:
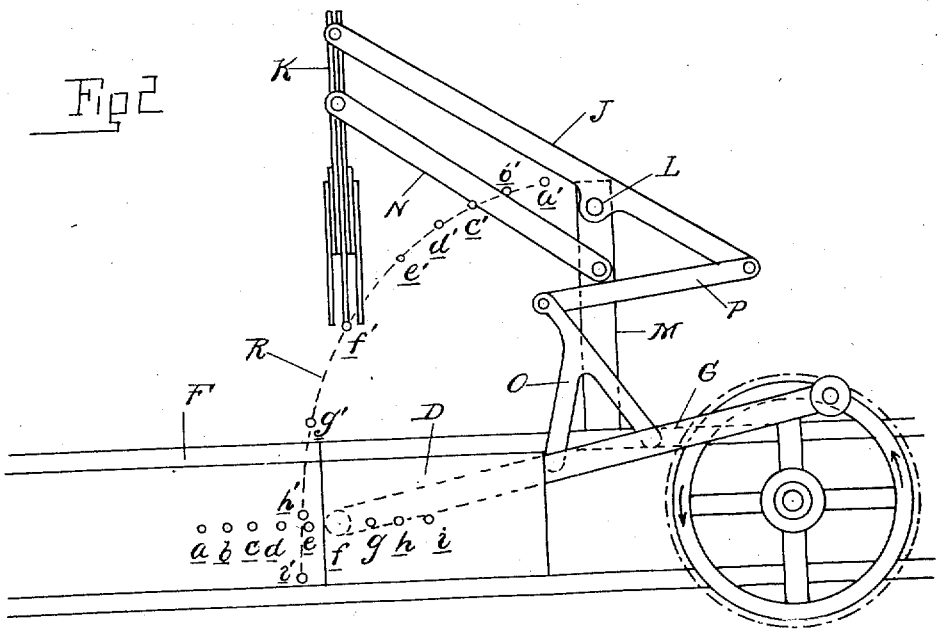
Figure 1:
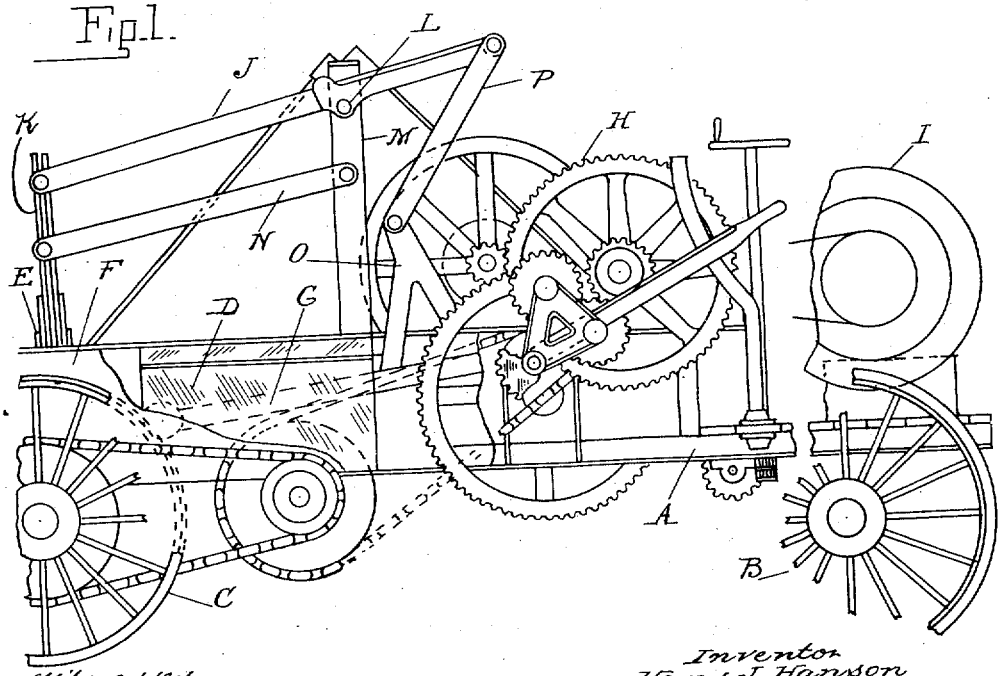

In the drawings: Figure 1 is a side elevation, partly in section, of the press; and Fig. 2 is a longitudinal section illustrating the construction of the plunger-operating mechanism.

As illustrated, A is the frame of the machine, which is mounted upon the forward wheels B and rear traction wheels C. The press in its general features of construction is similar to constructions heretofore used, and comprises the usual reciprocatory plunger D and feeder E, the latter being employed to feed the hay downward into the box or receptacle F in advance of the movement of the plunger. The plunger D is operated by a pitman G, which is actuated by any suitable mechanism—such as the step-down gear train H driven from a motor I.

In order to simplify the construction, and to obtain a more accurate timing of the parts, I preferably operate the feeder mechanism through the medium of the pitman G, and, as shown, J is a walking beam lever, which is pivotally connected at one end with the shank K of the feeder E and is fulcrumed upon a pivot L on an upright standard M on the frame.

N is a link substantially parallel to the lever J and pivotally connected to the shank K and the standard M.

O is a bracket arm extending laterally in an upward direction from the pitman G, and P is a pivotal link connected with the bracket O on the opposite end of the walking beam lever J.

The construction is such that the movement of the pitman G will not only operate the plunger D, but will also actuate the walking beam J through the medium of the bracket O and link P. This will cause the reciprocation of the feeder E, and the movement is timed to depress said feeder after the retraction of the plunger D and to raise it in advance of the movement of the plunger.

The function of the feeder is to press the material downward into the box where it will be in the path of the plunger which compresses it. This operation must of necessity be performed during the interval when the plunger is being retracted, as both the plunger and feeder are actuated by continuously operating mechanism. As a result with certain constructions of this type which have heretofore been used, the material has been pressed downward by the feeder against the upper face of the plunger before the latter is fully withdrawn, thereby greatly increasing the friction of the machine. With the present construction this difficulty is avoided by so constructing the feeder-operating mechanism as to quickly withdraw it from the path of the plunger by an accelerated movement, and then to delay its downward movement until the plunger is sufficiently withdrawn to avoid friction. The desired result is obtained first by operating the feeder at greatest speed while the plunger is moving at slow speed, and giving the feeder an accelerated upward movement, thus providing more time for the operator to get the hay to the feed opening. This is accomplished by a relative positioning of the pivotal points substantially as indicated. The character of the movement may be better understood by the diagrammatic representation in Fig. 2, in which the points *a b c d*, etc., represent different positions of the plunger in its reciprocating movement, said points being spaced equal distances from each other. The dotted line R represents the path followed by the lower end of the feeder and upon this line the points *a′ b′ c′ d′*, etc., correspond to the points *a b*, etc., and indicate the position of the feeder in each position of the plunger. It will be noted from the differential spacing of the points *i′ h′ g′ f′*, etc., that the feeder when moving upward through said points travels at highest speed when clearing the path of the plunger, and is then gradually retarded through the remainder of its upward movement. During its downward movement the speed will still be retarded so that time is given for the withdrawal of the plunger before pressure on the hay is exerted by the feeder, thereby avoiding friction.

What I claim as my invention is:—

1. In a baling press, the combination with a reciprocatory plunger and a transversely reciprocating feeder, of a pitman rod for actuating said plunger, and means connecting said feeder with the pitman rod for raising the feeder with a progressively retarding speed, comprising a walking beam connected to said feeder, a bracket arm projecting laterally from said pitman rod, and a link connecting said bracket arm with said walking beam.

2. In a baling press, the combination with a reciprocatory plunger and a transversely reciprocating feeder, of a pitman rod for actuating said plunger, and means operated from said pitman rod by the movement thereof transverse to the direction of movement of said plunger, for raising said feeder with a progressively retarding speed, the speed being greatest while the feeder is clearing the path of the plunger.

3. In a baling press, the combination with a reciprocatory plunger and a transversely reciprocating feeder, of a pitman rod for actuating said plunger, and means connecting the feeder with the pitman rod for raising said feeder with a progressively retarding speed, comprising a walking beam connected to said feeder, a substantially parallel pivotal link also connected to said feeder, a bracket arm projecting laterally from said pitman rod and a link connecting said bracket arm with said walking beam.

4. In a baling press, the combination with a frame, of a reciprocatory plunger and a transversely reciprocating feeder, of a pitman rod for actuating said plunger, and means connecting said feeder with the pitman rod for raising said feeder with a progressively retarding speed, comprising a walking beam connected to said feeder, a link connecting said walking beam and said pitman rod, and a support carried by said frame to which the walking beam is pivoted.

5. In a baling press, the combination with a reciprocatory plunger and a transversely reciprocating feeder, of a pitman rod for actuating said plunger, a walking beam connected to said feeder, and means connecting said walking beam and pitman rod for raising said feeder with a progressively retarding speed, the speed being slowest adjacent to the limit of upward movement of the feeder.

6. In a baling press, the combination with a frame, a reciprocatory plunger and a transversely reciprocating feeder, of a pitman rod for actuating said plunger, a walking beam connected to said feeder, a support carried by said frame to which said walking beam is pivoted, an inverted Y-shaped arm projecting laterally from said pitman rod, and a link connecting said walking beam and said laterally projecting arm.

7. In a baling press, the combination with a reciprocatory plunger and a transversely reciprocating feeder, of a pitman rod for actuating said plunger, and means operated from said pitman rod for raising said feeder with a progressively retarding speed and for depressing said feeder at a speed less than the upward speed while clearing the plunger.

In testimony whereof I affix my signature in the presence of two witnesses.

HANS J. HANSON.

Witnesses:
LEWIS M. ELLIS,
T. S. LANGFORD.

Copies of this patent may be obtained for five cents each, by addressing the "Commissioner of Patents, Washington, D. C."